UNITED STATES PATENT OFFICE.

WILLIAM TEN EYCK, OF PIKE TOWNSHIP, COUNTY OF CLEARFIELD, PA.

IMPROVED PAINT COMPOSITION.

Specification forming part of Letters Patent No. 41,729, dated February 23, 1864.

*To all whom it may concern:*

Be it known that I, WILLIAM TEN EYCK, of the borough of Curwinville, Pike township, in the county of Clearfield and State of Pennsylvania, have invented or produced a new and Original Paint Composition; and I do hereby declare that the following is a full and exact description of the same.

I take one part rice-flour, one part whiting, one part flour-of-lime or plaster-of-paris, and thoroughly mix and combine the same. Then to every twenty-five pounds of this composition I add one pound of white glue and sufficient water to bring the composition to the proper consistency.

Having thus described my improved composition, what I claim therein as new, and desire to secure by Letters Patent, is—

Compounding and mixing together the aforementioned ingredients to form a paint composition, substantially as herein described.

WM. TEN EYCK.

Witnesses:
    JAMES T. BROWN,
    A. J. DRAUCKER.